United States Patent [19]

Piestert

[11] Patent Number: 5,264,486

[45] Date of Patent: Nov. 23, 1993

[54] TWO-COMPONENT POLYURETHANE SEALANTS, AND A MIXING METHOD THEREFOR

[75] Inventor: Gerhard Piestert, Schwetzingen, Fed. Rep. of Germany

[73] Assignee: Bostik, Inc., Middleton, Mass.

[21] Appl. No.: 802,371

[22] Filed: Dec. 4, 1991

[30] Foreign Application Priority Data

Dec. 5, 1990 [DE] Fed. Rep. of Germany ....... 4038815

[51] Int. Cl.$^5$ ............................................. C08K 5/01
[52] U.S. Cl. ..................................... 524/745; 524/748; 524/753
[58] Field of Search ........................ 524/745, 768, 753

[56] References Cited

U.S. PATENT DOCUMENTS

| | | | |
|---|---|---|---|
| 4,063,002 | 12/1977 | Wilson, Jr. | 524/59 |
| 4,318,959 | 3/1982 | Evans et al. | 524/507 |
| 5,102,969 | 4/1992 | Scheffler et al. | 528/468 |

FOREIGN PATENT DOCUMENTS

| | | |
|---|---|---|
| 0351728 | 1/1990 | European Pat. Off. . |
| 371370 | 6/1990 | European Pat. Off. . |
| 404315 | 12/1990 | European Pat. Off. . |
| 3042012 | 5/1982 | Fed. Rep. of Germany . |
| 2303844 | 10/1976 | France . |
| 1104831 | 1/1964 | United Kingdom . |

*Primary Examiner*—Maurice J. Welsh
*Assistant Examiner*—Duc Truong
*Attorney, Agent, or Firm*—David G. Conlin; Peter F. Corless; Gregory D. Williams

[57] ABSTRACT

2-component polyurethane sealants for the direct glazing of motor vehicles, comprising (A) a pasty polyurethane component containing a polyurethane prepolymer having free isocyanate groups, and a curing agent, and (B) a pasty solvent-containing component, where component (A) contains at least one latent, solvent-activatable curing agent which can be activated by means of solvents, and component (B) contains a polar, aprotic solvent and water reversibly bonded to a carrier substance which liberates the water in a delayed manner after components (A) and (B) have been mixed.

31 Claims, No Drawings

TWO-COMPONENT POLYURETHANE SEALANTS, AND A MIXING METHOD THEREFOR

BACKGROUND OF THE INVENTION

The invention relates to a 2-component polyurethane sealants, in particular for the direct glazing of motor vehicles, comprising (A) a pasty polyurethane component containing a polyurethane prepolymer having free isocyanate groups, and a curing agent, and (B) a pasty component. Two-component sealants have been disclosed in GB-A-1,104,831 and EP-A-371,370, the curing agent being liberated by water and component (B) containing water as an essential constituent.

A fundamental problem of previous sealants is that, on the one hand, the processing or pot time must be sufficiently long to ensure flawless processing of the sealant before it cures, but, on the other hand, the curing must, for obvious reasons, take place as rapidly as possible when processing is complete. Finally, the polyurethane component (A) must also have an adequate shelf life.

Although previous 2-component polyurethane sealants mentioned at the outset have sufficient strength, for example, one hour after mixing, the processing time is, however, too short, which means problems can arise even during mixing of components (A) and (B) due to premature gelling of the sealants.

SUMMARY OF THE INVENTION

In accordance with the present invention, it has now been found that a particularly favorable behavior with respect to processing time and curing rate is obtained in 2-component polyurethane sealants if the curing agent of component (A) is solvent-activatable and component (B) contains solvents and water reversibly bonded to a carrier substance which liberates the water in a delayed manner after components (A) and (B) have been mixed.

DETAILED DESCRIPTION OF THE INVENTION

The present invention accordingly provides 2-component polyurethane sealants, in particular for the direct glazing of motor vehicles, comprising (A) a pasty polyurethane component containing a polyurethane prepolymer having free isocyanate groups, and a curing agent, and (B) a pasty solvent-containing component, which are characterised in that component (A) contains a latent curing agent which can be activated by means of solvents, and component (B) contains a polar, aprotic solvent and water reversibly bonded to a carrier substance which liberates the water in a delayed manner after components (A) and (B) have been mixed.

As shown by the examples below, the sealants according to the invention have, on the one hand, an entirely adequate processing time or gelling time of from 5 to 10 minutes, while also having, on the other hand, a shear strength of approximately 0.1 N/mm$^2$ after one hour, and a final shear strength of about 4N/mm$^2$ after 24 hours.

In component (B), the carrier substance ensures that a delayed release of water takes place, which results in an extension of the processing time, but nevertheless with a rapid achievement of the final strength.

Suitable carrier substances for binding the water in component (B) are all substances which are capable of reversibly binding water and liberating the water in a delayed manner after components (A) and (B) have been mixed. Examples of preferred carrier substances are ground cellulose, starch and cork.

The carrier substance is preferably fine particulate, so that, for example, at least 50 % of the particles have a size of less than 40 μm. Examples of suitable commercial products are Type XX-01 cellulose powder from Mikro-Technik in Burstatt/Miltenberg or native potato starch from Merck.

Ground cellulose and starch are capable of reversibly binding water up to a maximum ratio by weight of 1:1.

In a preferred embodiment, the carrier substance is dispersed in an inert viscous liquid in order to achieve the desired pasty consistency. Suitable viscous liquids here are in principle all those which do not react, in particular, with the isocyanate groups of the polyurethane prepolymer of component (A) and also have no other disadvantageous effect on the cured sealant.

The inert viscous liquids are preferably plasticizers for the cured sealant, preference being given again to alkylsulphonic acid esters of phenol or cresol, methylstyrene adducts and phthalic acid esters.

Examples of suitable commercial products are MESAMOLL® (alkylsulphonic acid ester of phenol) from Bayer AG or ACTREL 400 (product of the addition reaction of methylstyrene and binuclear, partially hydrogenated aromatics) from Esso or SANTICIZER 160 (benzyl butyl phthalate) from Monsanto.

Component (B) contains a polar, aprotic solvent, such as, for example, n-butyrolactone, γ-butyrolactone, chlorobenzene, acetonitrile, dimethylformamide, dioxane, methyl ethyl ketone, N-methylpyrrolidone, tetrahydrofuran or N-vinylpyrrolidone.

In addition to the solvent, component (B) also contains water, the amount being at most 10 %, preferably less than 5 %, based on the total amount of component (B).

Furthermore, component (B) preferably contains a thixotropic agent, carbon black being particularly preferred.

Component (B) may also contain further conventional additives and processing assistants, such as catalysts, dyes, pigments, fillers or wetting agents.

In a preferred embodiment, component (B) contains a wetting agent. Wetting agents contribute to compatibility and thus improve the smoothness. Preferred examples of suitable wetting agents are sorbitan monolaurate (for example the commercial product SPAN 20® from FLUKA AG) and polyoxyethylene (10) oleyl alcohol (for example BRIJ 96® from ICI).

Suitable polyurethane prepolymers are known to persons skilled in the art. These prepolymers contain terminal free isocyanate groups, which are capable of reacting both with the curing agent present in component (A) and with the water introduced through component (B), with enlargement of the molecule and curing. This involves the following reactions occurring simultaneously. The solvent from component (B) activates the curing agent, the latter reacting with polyurethane prepolymer; however, the water present in component (B) can also react directly with the isocyanate groups.

The curing agent of component (A) is preferably a complexed amine. A preferred complexed amine is the NaCl complex compound of 4,4'-diaminophenylmethane. Suitable curing agents of component (A) are also amine complexes with sodium bromide, sodium iodide, sodium nitrite, lithium chloride, lithium bromide, lithium iodide, lithium nitrite or sodium cyanide, amine complex compounds of the alkali metal or alkaline earth metal salt type and microencapsulated, solvent-activatable polyamines or polyols. Solvent-activatable curing agents of this type are disclosed in EP-A-0 351 728.

In a further preferred embodiment, component (A) contains a thixotropic agent, with carbon black being particularly preferred.

Although the isocyanate groups of the polyurethane prepolymer are also capable of reacting with the water of atmospheric moisture, the principal reaction, due to the early shear strength which is desired, is the crosslinking reaction with the water liberated from the carrier substance of component (B) or with the solvent-activated curing agent in component (A). The ratios can be selected so that there is either a stoichiometric excess or a substoichiometric amount of free NCO groups relative to the reactive groups present in the curing agent. The former case is preferred since the processing time can then be better adjusted via the water/carrier substance ratio and the amount of water in component (B).

If the solvent-activatable curing agent is used in a substoichiometric amount, the curing rate in the sealants according to the invention can be controlled, within certain limits which are of practical importance, by the ratio of carrier substance to water. In general, a ratio of from 1:0.25 to 1:1 is used here.

Both component (A) and component (B) are in pasty form, i.e. they are not free-flowing.

In addition to the pasty consistency of components (A) and (B), the non-Newtonian properties (thixotropic behavior) also play a part since both the pasty consistency and the non-Newtonian properties affect the mixing behavior of the components. The control is in each case affected through the choice of the type and amount of the inert viscous liquid and of the thixotropic agent.

In general, component (B) contains the carrier substance and water in approximately equal parts by weight, but, depending on the requirements, the amount of water may also be very much lower. As far as the amount of component (B) relative to component (A) is concerned, the molar amounts of curing agent on the one hand and the free isocyanate groups in component (A) on the other hand must again be taken into account, preference being given, as stated above, to a stoichiometric excess of NCO.

In the sealants according to the invention, component (A) contains from 20 to 80 parts by weight, preferably from 35 to 55 parts by weight, and in particular from 40 to 45 parts by weight, based on 100 parts by weight of component (A), of the polyurethane prepolymer, and from 20 to 120 eq-%, preferably from 40 to 80 eq-%, in each case based on the number of equivalents of isocyanate in the polyurethane prepolymer, of the curing agent. If component (A) contains a thixotropic agent, the latter is present in such amounts that the material is firm and not free-flowing. In the case of carbon black, amounts of about 7 parts by weight per 100 parts by weight of component (A) are generally necessary for this purpose.

Component (B) contains the carrier substance in an amount sufficient for complete binding of the water. The ratio by weight between the carrier substance and water is generally from 1:0.25 to 1:1, preferably from 1:0.5 to 1:0.8. The carrier substance (with the water bonded thereto) is preferably dispersed in an inert viscous liquid. If component (B) contains a thixotropic agent, for example carbon black, the latter is preferably present in such amounts that a pasty consistency is produced. To this end, amounts of 10–25 % by weight, based on component (B), are generally sufficient.

The invention furthermore relates to a process for mixing components (A) and (B) of the present invention using a static mixer, which process is characterised in that components (A) and (B) are employed in a ratio by volume of at least 2:1, and a static mixer is used which has only from 15 to 75 % of the number of mixing elements necessary for achieving homogeneous mixing of components (A) and (B) in the ratio by volume 1:1.

In all cases, components (A) and (B) are employed in a ratio by volume of at least 2:1, preferably in the range from 2:1 to 100:1, particularly preferably from 5:1 to 100:1.

In a preferred embodiment, the mixing is carried out using a static mixer which has only from 40 to 50 % of the number of mixing elements necessary to mix components (A) and (B) homogeneously in the ratio by volume of 1:1.

In a further embodiment, a component (B) which contains the water in free form and not bonded to a carrier substance is employed in the mixing process. In order to ensure an appropriate processing time it is necessary in this case to employ a component (A) with low reactivity.

In a specific embodiment, a component (B) which contains no water is employed in the mixing process. Nevertheless, the curing agent is, here too, employed in substoichiometric amounts, since the curing reaction otherwise proceeds too rapidly. Complete curing is effected by atmospheric moisture in this case.

The static mixer used for the mixing preferably has an internal diameter in the range from 5 to 30 mm, in particular in the range from 10 to 20 mm.

Static mixers, also known as motionless mixers, have non-moving, i.e. static, guide or mixing elements built into the flow channel. In this respect, see Perry's Chemical Engineers Handbook, 6th Edition (1984), 19-22 to 19-23. Particularly preferred static mixer designs are the Kenics mixer and the Package mixer.

Preference is given to a Kenics mixer which has only from 4–18, in particular from 8–12, mixing elements instead of the at least 24 mixing elements necessary to mix components (A) and (B) homogeneously in the ratio by volume 1:1.

If a Package mixer is used, it preferably has only from 4 to 21, in particular from 11 to 14, mixing elements instead of the least 28 mixing elements necessary to mix components (A) and (B) homogeneously in the ratio by volume of 1:1.

In the process of the invention, the mixing of components (A) and (B) is not continued until homogeneity is achieved. The reduced number of mixing elements in the mixer allows the operating pressure to be reduced, so that satisfactory discharge rates are possible using conventional spray guns.

Processing by means of a shortened static mixer results in a less than homogeneous state. The consequence of this is that, due to the limitation of diffusion, the curing agent of component (A) is not displaced in a sudden manner by the solvent of component (B), which in turn means that the curing, preferably amine curing, of the polyurethane prepolymer only sets in gradually, while, on the other hand, the diffusing water from component (B) is itself also capable of reacting with the isocyanate groups. Overall, this achieves a particularly balance ratio between processing time and early shear strength.

The examples below illustrate the invention. Unless otherwise stated, parts are by weight.

I. Preparation of a component (A1)

21.35 parts of octyl decyl phthalate (WITAMOLP 118 from Hüls AG), 7.143 parts of diphenylmethane 4,4'-diisocyanate (DESMODUR ® 44MS from Bayer AG), 21.69 parts of polypropylene oxide triol (DESMOPHEN ® 1919U from Bayer AG), 11.21 parts of polypropylene oxide diol (DESMOPHEN 1900U from Bayer AG), 0.10 part of p-toluenesulphonamide (AKZO) and 21.00 parts of carbon black (ELFTEX ® 465 from Carbot) are dispersed over the course of 30 minutes, 0.1 part of Bi catalyst (COSCAT 83 from Erbslöh) and 7.565 parts of octyl decyl phthalate (WITAMOL ® 118 from Hüls AG) were then added, and the mixture was stirred for one hour. 0.2 part of Bi catalyst (COSCAT ® 83 from Erbslüh), 0.032 part of tosyl isocyanate (Bayer AG), 7.305 parts of octyl decyl phthalate (WITAMOL ® 118 from Hüls AG) and 5.53 parts of the NaCl complex of 4,4'-diaminophenylmethane (CAYTUR ® 21 from Uniroyal) were then stirred in at room temperature.

The pasty mixture obtained is transferred into cartridges (in the absence of air).

II. Preparation of a component (A2)

As for A1, but only 0.56 times the amount of amine was employed.

III. Preparation of a component (B1)

22.5 parts of carbon black (ELFTEX ® 465 from Carbot), 3.6 parts of water, 4.5 parts of cellulose (XX-01 ® from Mikro-Technik) and 74.4 parts of butyrolactone are dispersed for 30 minutes.

The pasty mixture obtained is transferred into cartridges.

IV. Preparation of a component (B2)

23.75 parts of carbon black (ELFTEXO 465 from Carbot), 1.1 parts of water, 1.375 parts of cellulose (XX-01 ® from Mikro-Technik), 38.702 parts of butyrolactone, 38.762 parts of phenol alkylsulphonic acid ester (plasticizer, MESAMOLL ® from Bayer AG) were dispersed for 30 minutes.

The pasty mixture obtained is transferred into cartridges.

V. Preparation of a component (B3)

96.4 parts of butyrolactone are mixed with 3.6 parts of water and transferred into cartridges.

Application of the adhesive using a Kenics mixer

A cartridge containing component (A) and a cartridge containing component (B) (cartridge length 150 mm, diameter 46 mm (component (A)) or 17.2 mm (component (B)), A : B volume ratio = 100:14 were connected, via an adaptor, to a Kenics mixer (diameter 13 mm) having 12 elements.

The cartridges attached to the mixer were placed in a twin-cartridge hand gun (model "HILTI P2000"), and the adhesive was forced out onto primed steel test specimens (primer: Primer Clear ®, BOSTIK; bonded area: 25×10 mm with a film thickness of 2 mm).

TABLE I

| | Pot time: | | |
|---|---|---|---|
| | B1 | B2 | B3 |
| A1 | 2 min | 5 min | inadequate mixing |
| A2 | 5 min | 10 min | inadequate mixing |

TABLE II

| Shear strength (as a function of the curing time): | | | |
|---|---|---|---|
| | Curing time at room temperature | | |
| Combination | 1 h | 24 h | 7 days |
| A1/B1 | 0.34 N/mm² | 1.9 N/mm² | 2.9 N/mm² |
| A1/B2 | 0.6 " | 5.0 " | 5.4 |
| A2/B1 | 0.09 " | 4.0 " | 4.5 " |
| A2/B2 | 0.07 " | 3.8 " | 4.5 " |

Application of the adhesive using a Package mixer

The application was carried out in the same manner as described above, but, instead of the Kenics mixer, a Package mixer (TAH Industries No. 020-064, diameter 18.75 mm) having 14 mixing zones which are connected to the two cartridges.

TABLE III

| | Pot time: | | |
|---|---|---|---|
| | B1 | B2 | B3 |
| A1 | 2 min | 5 min | inadequate mixing |
| A2 | 5 min | 10 min | inadequate mixing |

TABLE IV

| Shear strength (as a function of the curing time): | | | |
|---|---|---|---|
| | Curing time at room temperature | | |
| Combination | 1 h | 24 h | 3 days |
| A1/B1 | 0.3 N/mm² | 1.5 N/mm² | 2.8 N/mm² |
| A1/B2 | 0.1 " | 3.5 " | 4.0 " |
| A2/B1 | 0.09 " | 3.4 " | 3.9 " |
| A2/B2 | 0.06 " | 3.2 " | 3.8 " |

Tables I and III show that mixing of the pure solvent mixture B3 with the pasty component A does not take place since the viscosity and consistency of the two components is different.

It can be seen from Tables II and IV that the shear strength of the combinations A1/B1 and A1/B2 is sufficiently high after only 1 hour.

What is claimed is:

1. A 2-component polyurethane sealant for the direct glazing of motor vehicles, comprising (A) a pasty polyurethane component comprising a polyurethane prepolymer having free isocyanate groups, and a curing agent, and (B) a pasty solvent-containing component, where component (A) contains at least one latent, solvent-activatable curing agent, and component (B) contains a polar, aprotic solvent and water reversibly bonded to a carrier substance which liberates the water in a delayed manner after components (A) and (B) have@been mixed.

2. The sealant according to claim 1, wherein component (B) contains a polar, aprotic solvent selected from the group of n-butyrolactone, γ-butyrolactone, chlorobenzene, acetonitrile, dimethylformamide, dioxane, methyl ethyl ketone, N-methylpyrrolidone, tetrahydrofuran or N-vinyl-pyrrolidone.

3. The sealant according to claim 1, wherein component (B) contains, as carrier substance, ground cellulose, starch or cork.

4. The sealant according to one of claim 1, wherein component (B) contains the carrier substance dispersed in an inert viscous liquid.

5. The sealant according to claim 4, wherein the viscous liquid is a plasticizer for the cured sealant.

6. The sealant according to claim 5, wherein the plasticizer is selected from the group of alkylsulphonic acid esters of phenol or cresol, methylstyrene adducts and phthalic acid esters.

7. The sealant according to claim 1, wherein component (B) contains a thixotropic agent.

8. The sealant according to claim 7, wherein the thixotropic agent is carbon black, pyrogenic silica or a urea compound.

9. The sealant according to claim 1, wherein component (B) contains additives and processing assistants.

10. The sealant according to claim 9, wherein component (B) contains a wetting agent as additive.

11. The sealant according to claim 1, wherein component (A) contains a complexed amine as curing agent.

12. The sealant according to claim 11, wherein the amine is the NaCl complex compound of 4,4'-diaminophenylmethane.

13. The sealant according to claim 11, wherein the amine is an amine complex with sodium bromide, sodium iodide, sodium nitrite, lithium chloride, lithium bromide, lithium iodide, lithium nitrite or sodium cyanide.

14. The sealant according to claim 11, wherein the amine is an amine complex compound of the alkali metal or alkaline earth metal salt type.

15. The sealant according to claim 1, wherein component (A) contains, as curing agent, microencapsulated, solvent-activatable polyamines or polyols.

16. The sealant according to claim 1, wherein component (A) contains a thixotropic agent.

17. The sealant according to claim 16, wherein the thixotropic agent is carbon black, pyrogenic silica or a urea compound.

18. A solvent-containing component (B) for use in sealants according to claim 1, wherein the solvent-containing component (B) contains a carrier substance for water which liberates the water in a delayed manner after components (A) and (B) have been mixed.

19. The solvent-containing component (B) according to claim 18, wherein the solvent-containing component (B) has a composition according to claim 2.

20. A process for mixing components (A) and (B) according to claim 1, using a static mixer, wherein components (A) and (B) are employed in a ratio by volume of at least 2:1, and a static mixer is used which has only from 15 to 75 % of the number of mixing elements necessary to mix components (A) and (B) homogeneously in the ratio by volume of 1:1.

21. The process according to claim 20, wherein a component (B) is employed which contains the water in free and not bonded to a carrier substance.

22. The process according to claim 20, wherein a component (B) is employed which contains no water.

23. The process according to any one of claims 20–22, wherein components (A) and (B) are employed in a ratio by volume in the range from 2:1 to 100:1.

24. The process according to claim 23, wherein a static mixer is used which has only from 40 to 50% of the number of mixing elements necessary to mix components (A) and (B) homogeneously in the ratio by volume of 1:1.

25. The process according to claim 24, wherein a static mixer having an internal diameter of from 5 to 30 mm is used.

26. The process according to claim 25, wherein a Kenics mixer is used which has from 4 to 18 mixing elements instead of the at least 24 mixing elements necessary to mix components (A) and (B) homogeneously in the ratio by volume of 1:1.

27. The process according to claim 25, wherein a Package mixer is used which has from 4 to 21 mixing elements instead of the at least 28 mixing elements necessary to mix components (A) and (B) homogeneously in the ratio by volume of 1:1.

28. The process according to claim 23 wherein components (A) and (B) are employed in a ratio by volume in the range of from 5:1 to 100:1.

29. The process according to claim 25 wherein a static mixer having an internal diameter of from 10 to 20 mm is used.

30. The process according to claim 26 wherein a Kenics mixture is used which has from 8 to 12 mixing elements.

31. The process according to claim 27 wherein a Package mixture is used which has from 11 to 14 mixing elements.

* * * * *